United States Patent [19]

Hanson et al.

[11] Patent Number: 5,189,582
[45] Date of Patent: Feb. 23, 1993

[54] RECORDING LATCH

[75] Inventors: Robert L. Hanson; John A. Bailey, both of St. Paul, Minn.

[73] Assignee: Minnesota Mining and Manufacturing Company, St. Paul, Minn.

[21] Appl. No.: 639,885

[22] Filed: Jan. 11, 1991

[51] Int. Cl.$^5$ .................... G11B 23/02; G11B 15/04
[52] U.S. Cl. ........................................ 360/132; 360/60
[58] Field of Search ............................ 360/60, 132; 242/198–201

[56] References Cited

U.S. PATENT DOCUMENTS

| | | | |
|---|---|---|---|
| 4,320,422 | 3/1982 | Rinkleib | 360/60 |
| 4,769,732 | 9/1988 | Tanaka | 360/132 |
| 4,875,109 | 10/1989 | Hanson | 360/60 |

Primary Examiner—John H. Wolff
Attorney, Agent, or Firm—Gary L. Griswold; Walter N. Kirn; Charles D. Levine

[57] ABSTRACT

The recording latch is pivotably mountable in a recording cassette between a record position and a no-record position. A plug at the bottom of the latch selectively blocks the record opening in the bottom wall of the cassette, and a flange at the top of the latch is selectively visible through the latch-engaging opening in the top wall. Two tabs are mounted on the flange, and the top wall of the cassette includes a record groove and a no-record groove. The tabs engage the record groove when the cassette can be used in the record mode and the tab engages the no-record groove when the cassette can not be used in the record mode. This engagement system is located entirely on the flange of the recording latch.

9 Claims, 1 Drawing Sheet

RECORDING LATCH

TECHNICAL FIELD

The present invention relates to recording latches for recording cassettes. More particularly, the present invention relates to a recording lockout latch for blocking or unblocking an opening in a wall of the cassette to enable a mechanism of the recorder to sense the status of the cassette.

BACKGROUND OF THE INVENTION

Magnetic tape cassette recorders typically incorporate a mechanism that senses whether a record opening in a wall of the cassette is blocked or unblocked. When the opening is unblocked, the recording function is disabled to prevent accidental erasure. U.S. Pat. No. 4,875,109, issued to Hanson, one of the inventors of this invention, and assigned to the Minnesota Mining and Manufacturing Co., the assignee of this invention, describes a pivoting recording latch which performs this function.

The '109 recording cassette has a record opening in a bottom wall of the cassette and a web extending from the top wall of the cassette. The web partially closes a latch-engaging opening. The latch is pivotable between two positions and a plug at one end of the latch either blocks or unblocks the record opening while a flange at the other end of the latch is either visible or not visible at the latch-engaging opening in the top wall to indicate the record status. When the flange is visible it covers the web and when it is not visible it uncovers the web. The exposed face of the flange has a cavity into which a point can be inserted to pivot the latch. However, the '109 latch is secured in the record position in the top wall of the cassette while the latch is secured in the no-record position in the bottom wall of the cassette. As there is positional shifting of the top and bottom walls during assembly, uniformity of latching can be lost from one cassette to the next.

SUMMARY OF THE INVENTION

The recording latch of the present invention improves over the latch of the '109 patent in that the the latch is secured in both the record and no-record positions entirely in the top wall of the cassette and on the flange of the recording latch. The latch could alternatively be secured entirely in the bottom wall of the cassette. The recording latch is pivotably mountable in a recording cassette between a record position and a no-record position. The cassette includes a top wall and a bottom wall. The bottom wall includes a record opening which is blocked in the record position. The top wall includes a latch-engaging opening through which the latch is visible in the no-record position.

The recording latch includes an upper body portion, a lower body portion, and a pair of central arms located between the upper and lower body portions and extending in opposite directions. The pair of central arms includes centering ribs located on at least one of the top and bottom of both arms. The centering ribs prevent the recording latch from sliding in a direction parallel to the central arms and misaligning. A plug is disposed at the bottom of the lower body portion to selectively block the record opening, and a flange is disposed at the top of the upper body portion. The flange is selectively visible through the latch-engaging opening in the top wall.

Two spring arms are formed on the top surface of the flange and two tabs are mounted, one on each end of a respective spring arm. The top wall of the cassette includes a record groove and a no-record groove in which the tabs are alternately receivable. The tabs engage the record groove when the cassette can be used in the record mode and the tab engages the no-record groove when the cassette can not be used in the record mode. The tab and groove engagement system secures the position of the latch and controls the forces required to pivot the latch between the record and no-record positions.

Preferably, the upper surface of the flange and the adjacent portion of the lower surface of the top wall are complementarily curved. Also, the flange includes an engagement slot which permits the latch to be engaged and pivoted between the record and no-record positions with or without any tools. To further facilitate this, the latch-engaging opening in the top wall is formed of a width sufficient to permit easy finger access to the flange.

DETAILED DESCRIPTION OF PREFERRED EMBODIMENTS

Figure 1:
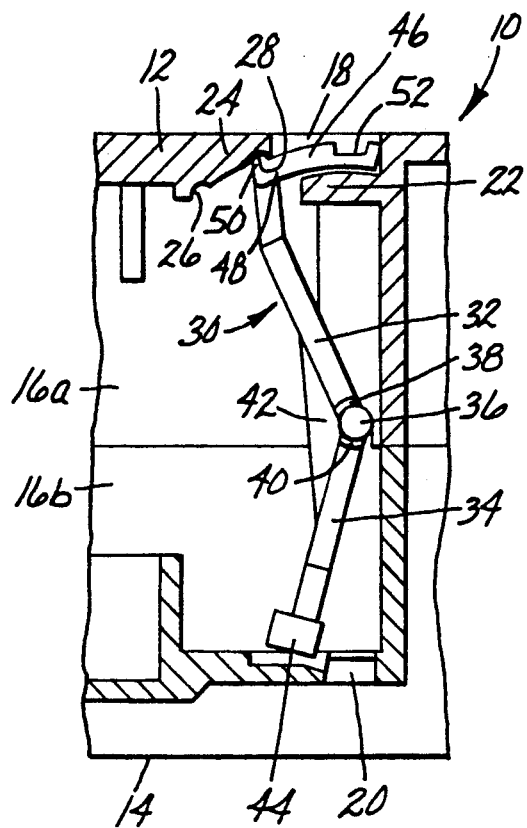
FIG. 1 is a side view of a portion of a video cassette, broken away to show a recording latch of the invention in the no-record position.
Figure 2:
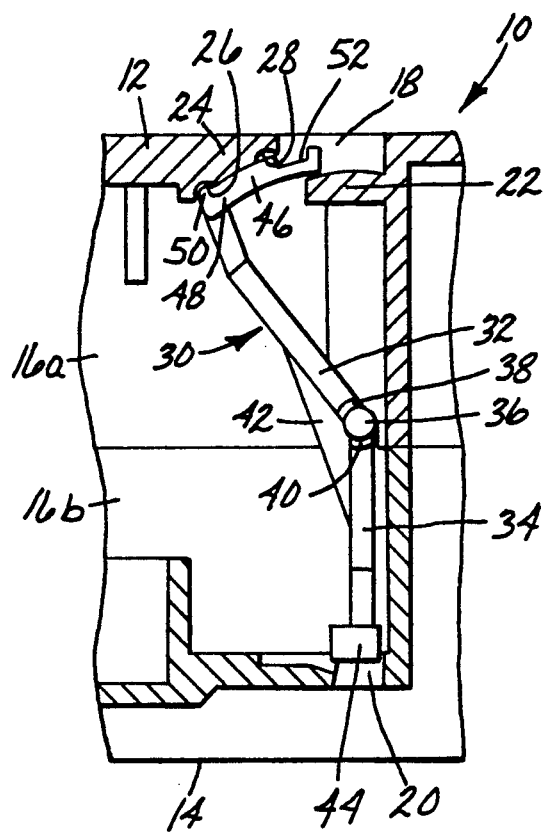
FIG. 2 is a view similar to that of FIG. 1 with the recording latch in the record position.
Figure 3:
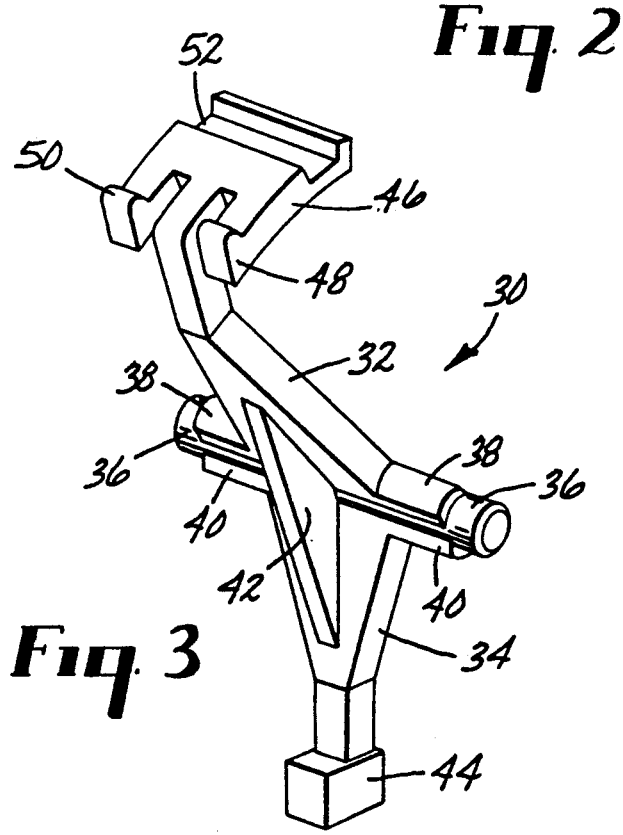
FIG. 3 is a perspective view of the recording latch of FIGS. 1 and 2.

The recording latch 30 of the present invention is mounted in a recording cassette and pivots between a record position and a no-record position. Referring to FIGS. 1 and 2, the cassette 10, which can be a digital video cassette, has a broad cover or top wall 12, and a base or broad bottom wall 14. A pair of tape reels (not shown) are housed in the cassette 10 and a record opening extends between the reels through the bottom wall.

The top wall 12 includes a top compartment 16a and the bottom wall 14 includes a bottom compartment 16b. A latch-engaging opening 18 in the top wall 12 extends into the top compartment 16a and a record opening 20 in the bottom wall 14 extends into the bottom compartment 16b. The top and bottom compartments 16a, 16b meet at the junction of the top and bottom walls 12, 14. A web 22 extends inwardly from a portion of the top wall 12 and blocks part of the latch-engaging opening 18. In the record position, the record opening 20 is blocked to permit recording and the latch is not visible in the latch-engaging opening. In the no-record position the record opening 20 is unblocked to prevent recording and the latch is visible in the latch-engaging opening 18.

The recording latch 30 includes an upper body portion 32 connected to a lower body portion 34 through a pair of central arms 36 located between the body portions 32, 34. The upper and lower body portions 32, 34 are V-shaped, narrowing from their ends adjacent the central arms 36 to a minimum width, and then extend to their outer ends in a rectangular shape. The rectangular-shaped portion of the upper body portion 32 is formed at an angle with the V-shaped portion. A strengthening brace 42 is formed between the upper and lower body portion 32, 34 to strengthen the latch 30.

The central arms 36 extend in opposite directions and each is pivotably received by a notch (not shown) in the top compartment 16a of the top wall 12. Preferably, each central arm 36 includes centering ribs 38, 40 located on the top and bottom of both arms, respectively, although only centering ribs 38 or only centering ribs 40 can be used effectively. The centering ribs 38, 40 prevent the recording latch 30 from sliding in a direction parallel to the central arms 36 and misaligning.

A rectangular plug 44 is disposed at the bottom of the lower body portion 34. The plug 44 blocks the record opening 20 in the bottom wall 14 of the cassette 10 as shown in FIG. 2 when the latch 30 is in the record postion. The plug 44 unblocks the record opening 20 as shown in FIG. 1 when the latch 30 is in the no-record position.

A flange 46 is disposed at the top of the upper body portion 32. The flange 46 is generally parallel to the top wall 12 of the cassette 10. The flange 46 either covers or uncovers the web 22 when the latch is in its no-record and record positions, respectively. The flange 46 is visible through the latch-engaging opening 18 in the top wall 12 in the no-record position and is not visible in the record position. Preferably, the upper surface of the flange 46 and the adjacent portion of the lower surface of a projection 24 of the top wall 12 have complementary curved surfaces. Also, the lower surface of the flange 46 and the upper surface of the web 22 preferably are formed with complementary curved surfaces.

Two spring arms 48 are formed on the top surface of the flange 46 and a tab 50 is mounted on one end of each spring arm 48. The projection 24 of the top wall 12 of the cassette 10 has a record groove 26 and a no-record groove 28 in which the tabs 50 are alternately receivable. The tabs 50 engage the record groove 26 when the cassette can be used in the record mode as shown in FIG. 2. In the record mode, most of the flange 46 is hidden from view. The tab 50 engages the no-record groove 28 when the flange 46 covers the web 22 to lock the latch 30 in the no-record mode as shown in FIG. 1. The tab and groove engagement system secures the latch 30 and controls the forces required to pivot the latch 30 between the record and no-record positions. This engagement system secures both the record and no-record positions entirely on the flange 46 of the recording latch 30 and entirely in the top compartment 16a of the top wall 12 of the cassette.

When the latch 30 is pivoted from the no-record mode of FIG. 1 to the record mode of FIG. 2 to retract the flange 46 beneath the top wall 12, the external force on the flange 46 first forces the tabs 50 out of the no-record groove 28. The tabs 50 are biased by the spring arms 48 against the underside of the projection 24 of the top wall 12 as they move past the projection 24 until the pivoting motion is complete and the tabs 50 spring back into the record groove 26.

Additionally, the upper surface of the flange 46 includes an engagement slot 52 which permits the latch 30 to be engaged and pivoted between the record and no-record positions without any tools. Alternatively, the flange 46 could be formed with a projecting lip (not shown) instead of the slot. To further facilitate pivoting of the latch 30, the latch-engaging opening 18 in the top wall 12 is formed of a width, in a left-to-right direction in the plane of FIGS. 1 and 2, sufficient to permit easy finger access to the flange 46.

The latch 30 and the top wall 12 should be of contrasting colors. For example, the latch 30 can be green while the top wall 12 is black, so the green of the flange 46 is visible when it covers the web 22 (as in FIG. 1) to indicate no-record, and disappears beneath the top wall 12 (as in FIG. 2) when the latch is pivoted, thus exposing the black color of the web 22 to indicate record. Because record and no-record are indicated by distinctly different colors, as opposed to mere differences in position of the same color, the possibility of misreading the record status is virtually eliminated.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention.

We claim:

1. A recording latch which is pivotably mountable in a recording cassette between a record position and a no-record position, wherein the cassette includes a top wall and a bottom wall and the bottom wall includes a record opening which is blocked during one of the record and no-record positions, and the top wall includes a latch-engaging opening through which the latch is visible in one of the record and no-record positions, wherein the recording latch comprises:

an upper body portion;
a lower body portion;
a pair of central arms located between the upper and lower body portions and extending in opposite directions;
a plug disposed at the bottom of the lower body portion to selectively block the record opening;
a flange disposed at the top of the upper body portion to be selectively visible through the latch-engaging opening in the top wall; and
means for securing the position of the latch and controlling the forces required to pivot the latch between the record and no-record positions, wherein the securing means is located entirely on one of the upper body portion and lower body portion of the recording latch.

2. The recording latch of claim 1 wherein the securing means is located entirely on the upper body portion of the recording latch.

3. The recording latch of claim 2 wherein the securing means is located entirely on the flange.

4. The recording latch of claim 3 wherein the securing means comprises at least one tab mounted on the top surface of the flange, wherein the top wall of the cassette includes a record groove and a no-record groove in which the tab is alternately receivable, and wherein the tab engages the record groove when the cassette can be used in the record mode and the tab engages the no-record groove when the cassette can not be used in the record mode.

5. The recording latch of claim 4 wherein the securing means comprises two spring arms formed on the flange and two tabs each of which is mounted on the end of a respective spring arm.

6. The recording latch of claim 3 wherein the upper surface of the flange and the adjacent portion of the lower surface of the top wall are curved, complementary shapes.

7. The recording latch of claim 1 wherein the flange comprises an engagement slot to permit the latch to be engaged and pivoted between the record and no-record positions manually using only hands and without any tools.

8. The recording latch of claim 7 wherein the latch-engaging opening in the top wall is formed of a width sufficient to permit easy finger access to the flange to pivot the latch between the record and no-record positions.

9. The recording latch of claim 1 wherein the pair of central arms comprises centering ribs located on at least one of the top and bottom of both arms, wherein the centering ribs prevent the recording latch from sliding in a direction parallel to the central arms and misaligning.

* * * * *